Patented Aug. 31, 1954

2,688,004

UNITED STATES PATENT OFFICE 2,688,004

CONTROLLING THE CURE OF SYNTHETIC POLYMERS

William R. Lewis, Wilmer L. Bird, and Leon B. Page, Baton Rouge, La., assignors to Standard Oil Development Company, a corporation of Delaware No Drawing. Application October 30, 1951, Serial No. 253,976

8 Claims. (Cl. 260—23)

This invention is broadly related to the curing of low temperature isoolefin-multiolefin rubbery copolymers and, more particularly, is related to novel improvements in the processing of these synthetic, rubbery copolymers to decrease or prevent a prolonged and/or variable induction period or incipient cure period for isoolefin-multiolefin rubbery copolymers during their vulcanization.

It has been known that synthetic polymers can be produced by a variety of polymerization processes, including the polymerization of the isoolefins, particularly isobutylene, either alone, or preferably, in the presence of a minor amount of a wide variety of the multiolefins, particularly conjugated diolefins, such as isoprene and butadiene, by the application of a dissolved Friedel-Crafts catalyst, the preferred polymerization temperature ranging from about —50° C. to —100° C. or even lower to —165° C. This copolymer, when subjected to vulcanization, shows an excellent tensile strength, excellent elongation, and other valuable properties.

Although the isoolefin-multiolefin rubbery copolymers are generally quite satisfactory for vulcanization and processing, one of the more objectionable problems which has persisted with these polymers is an incipient cure period. In spite of ordinary care exercised during the curing operation, these polymers exhibit an incipient cure period in the vulcanization step before the actual chemical reactions of the vulcanization process begin to take place. Such an "induction" period in the curing operation lengthens unnecessarily the time required for the overall vulcanization process. Since, heretofore, control of this characteristic has been difficult, the induction period may vary widely from one batch of rubbery copolymer to another. In addition, the occurrence of variable induction or incipient cure, rather than optimum state of cure, is found to be responsible for variable factory vulcanization. For experimental and comparative testing purposes, this incipient cure time is measured by the Mooney scorch technique. A high Mooney scorch (reported in minutes) indicates a relatively long period of incipient cure. The Mooney scorch test can be used to predict reliably the incipient cure characteristics of copolymers.

In a thorough study of the incipient cure problem in connection with the vulcanization of isoolefin-diolefin copolymers, analytical data have been obtained which indicate a definite relationship between the overall soap content of the copolymer and the Mooney scorch value. A high soap content is generally accompanied by a high Mooney scorch, while a low soap content is characterized by a low Mooney scorch. The term "soap" is used here to include all salts of higher fatty acids, as well as mixtures thereof, for example, sodium stearate.

With regard to the exact factors which govern the Mooney scorch values of the finished but not vulcanized polymer, a number of materials are considered to be significant. These include sodium stearate and zinc stearate. The presence of sodium stearate in the finished polymer is objectionable as this causes high Mooney scorch. Zinc stearate has also been shown to be objectionable.

Zinc stearate is added to the rubber to control polymer particle size in the polymer recovery system. This material is partially hydrolyzed in the operation so that only a part of the zinc stearate is present as such in the finished polymer. Data indicate that the more extensive the hydrolysis of the zinc stearate, the lower the Mooney scorch.

Other materials which are believed to be of secondary significance are zinc hydroxide or oxide, and fatty acids. These materials may result from the hydrolysis of zinc stearate. Both are hydrolysis products of acid hydrolysis while only zinc hydroxide or oxide result from a caustic hydrolysis of the zinc stearate.

It is, therefore, believed that in order to avoid the undesirable factors tending to cause the variable and at times excessive incipient cure period, a prime essential is the maintenance of a relatively low pH, i. e., below 7.0, giving slightly acidic conditions throughout the aqueous polymer recovery operation. It is preferred that the pH throughout the entire aqueous polymer recovery system be controlled in the range from 4.5 to 6.5. It must never be permitted to go to the alkaline side of the pH scale.

This ultimate objective of maintaining a reduced pH in the aqueous polymer recovery system can be accomplished by exercising control of pH at a number of points in the slurry system. This control, together with the novel features in preparing the dispersing agent to control the final pH of this material, constitute the steps of the invention.

This novel improved process can be employed in processing raw materials consisting of low temperature interpolymers of an isoolefin with a multiolefin. The isoolefin is preferably isobutylene, although other isoolefins such as 2-methyl butene-1 or 2-methyl pentene-1 are similarly usable. The olefinic material may be any multiolefin having from 4 to 12 or 14 carbon atoms per molecule, butadiene, isoprene, piperylene, dimethyl butadiene, dimethallyl, myrcene, and the like, being the preferred diolefins. It may be noted that both conjugated and non-conjugated multiolefins are suitable and both diolefins and high unsaturates are similarly usable.

The materials are preferably used in a mixture containing a major proportion of the isoolefin with a minor proportion of the multiolefin, the preferred range being from 70 to 99.5 parts of the isoolefin with from 30 to 0.5 parts of the multiolefin although even high percentages of diolefin can be employed to give polymers of greater unsaturation. This mixture of isoolefin and multiolefin is usually dissolved in a solvent which is inert toward the Friedel-Crafts catalysts used.

The mixed olefinic materials and solvent are cooled to a temperature below 0° C., preferably within the range between −50° C. and −103° C., although temperatures as low as −164° C. may be used for some purposes. The cooling may be obtained by a refrigerating jacket upon the reactor, in which case any convenient refrigerant may be used. Alternatively, the cooling may be obtained by mixing into the olefinic material an appropriate refrigerant such as liquid propane, liquid ethane, solid or liquid carbon dioxide, liquid ethylene or even liquid methane.

The catalyst is preferably a solution of a Friedel-Crafts active metal halide material dissolved in a low-freezing, non-complex-forming solvent; that is, a solvent which forms no complex with the active metal halide and is liquid near or below the polymerization temperature.

The Friedel-Crafts catalyst which may be used to carry out the polymerization reaction can be aluminum chloride, aluminum bromide, zirconium chloride, titanium tetrachloride, boron fluoride or complexes thereof with various organic compounds. Most of these catalysts are solid, a limited number are liquid or gaseous and all are preferably used in solution.

The catalyst solvent can be any liquid which does not form a stable complex with the Friedel-Crafts catalyst, has a reasonably high solvent power for the particular metal halide used and has a reasonably low freezing point below 0° C. With aluminum chloride, the preferred catalyst solvents are ethyl and methyl chlorides and carbon disulfide. With boron trifluoride, the same solvents and in addition liquid ethylene, liquid ethane, liquid propane and even liquid butane or pentane are usable catalyst solvents. Boron fluoride is also advantageously used with solvents such as ethylidene difluoride, dichlorodifluoromethane, trichlorofluoromethane, and tetrachlorodifluoroethane. With aluminum bromide, the same list of solvents is likewise satisfactory, liquid propane, liquid butane and liquid pentane being particularly suitable.

The polymerization reaction is conducted by dispersing the catalyst rapidly into the olefinic material in as fine a state of subdivision as possible. A preferred method is to discharge the catalyst in the form of a very fine spray from a nebulizer onto the surface of the rapidly stirred olefinic material. Alternatively, the catalyst solution may be delivered into the eddy zone adjacent to a powerful, rapidly rotating stirrer, although other methods are usable, and will be obvious to those skilled in the art.

The polymerization proceeds rapidly to yield the interpolymer which ordinarily is removed from the reaction mixture and brought up to room temperature.

The above outlined method of producing the polymer is shown in greater detail in U. S. Patent 2,356,128 which is hereby incorporated into and made a part of this specification.

The resulting unsaturated rubbery polymer, having an iodine number of about 1 to 50 or even up to 175, is reactive with elemental sulfur, particularly in the presence of appropriate sulfurization aids. One preferred sulfurization aid is the material known as "Tuads" which is tetramethylthiuram disulfide. Alternatively, other adequate curing aids may be selected from those well known to the art. Curing conditions may be selected from the range between 240° F. to 350° F. for time intervals ranging from 5 minutes to 300 minutes. The resulting cured polymer generally shows a tensile strength within the range between about 1800 pounds per square inch and 4500 pounds per square inch and an elongation at break which may range from 500% to 1200% according to the compounding ingredients.

By carrying out the polymerization in the above described general scheme, the final product is obtained as a finely pulverulent form of polymer or interpolymer particles. A polymer having such physical characteristics is highly desirable in order to permit maximum speed and efficiency in processing the solid materials during subsequent work-up operations.

Because if the difficulty in obtaining the solid polymer in the form of small particle aggregates with a physical structure adapted for efficient and convenient subsequent processing through such steps as the flashing off of unreacted olefinic material, diluent and refrigerant if present and the washing out of spent catalyst or residual catalyst, it has been proposed previously to form the polymer as a slurry in the diluent and introduce the slurry into a flash tank of water to flash off the diluent and any remaining reactants. However, when operating in this manner, it has been found difficult to obtain stable water slurries which can be easily removed from the flash tank and pumped through pipelines. Also it is difficult to prevent cohesion between the particles of polymer, particularly in the water used for flashing off the diluent and the unreacted olefins, and to prevent adhesion of the particles of polymer to the reactor, to the walls of the flash tank, to transfer pipe lines, to the supporting screens in the drier, and other metallic surfaces of objects with which it comes in contact. These characteristics of the newly polymerized material interfere seriously with the complete removal of spent and surplus catalyst, since the sticky character of the polymer causes it to adhere to treating apparatus, and to cohere in relatively large lumps, containing occluded catalyst which cannot be washed out. Large lumps are also undesirable in the wash water since the resulting slurry plugs pipe lines and becomes so coarse that it cannot be removed from the slurry system.

When the polymerization reaction has reached the desired stage of completion, the entire reaction mixture, consisting of solid polymer particles, liquid, unreacted olefinic material, diluent, and residual catalyst is passed to a flash tank containing warm water. The warm water volatilizes out most of the volatile components, and at the same time, deactivates and washes out much of the deactivated catalyst. The polymer is in a finely-divided slurry form to facilitate handling by the addition to the warm water, prior to or simultaneously with the addition of the polymer thereto, of a suitable dispersing agent. This slurry dispersing agent may be any one of a number of inorganic salts of the higher molecular weight, saturated fatty acids and surface active agents generally. Preferred dispersing agents are finely divided aluminum monostearate, aluminum distearate, aluminum tristearate, zinc stearate, magnesium stearate, calcium stearate and similar salts of palmitic, etc. acids of high molecular weight. These dispersing agents which are water-insoluble may be slurried by means of a water-soluble, surface active material and introduced into the system or they may be manufactured in situ in the system from a saturated fatty acid via the alkali soap. Zinc stearate is much preferred for use as the dispersing agent since it is a valuable constituent in subsequent curing and compounding operations. The salt is introduced into the warm water with a water soluble wetting agent, such as the soluble soaps of petroleum sulfonic acids. The amount of salt added to the flash tank water may vary from 0.5 to 6% based on the dry polymer. A range of 1% to 4% is preferred.

In addition to the dispersing agent, a suitable anti-oxidant type of stabilizing agent is usually also added to the wash water. Materials suitable as anti-oxidant type stabilizers include aromatic amines such as phenyl-beta-naphthyl-amine, phenyl-alpha-naphthyl-amine, diphenyl-amine, tetramethyldiaminodiphenylmethane, ditolylamine, and diorthotolylethylene diamine, aminophenols, such as para-benzyl-aminophenol, sulfur-containing amines, such as mercapto-benzothiazole, diethylaminophenyl disulfide and thiourea, phenols, such as hydroquinone, 2,6-ditertiary-butyl-4-methylphenol, 2,4 - dimethyl-6-tertiary-butylphenol, 2,4,6-trimethylphenol, 4-methyl-2-normal-butylphenol, etc. However, in stabilizing copolymers of isobutylene with conjugated diolefins, only the 2,4,6-trialkylated phenols and 4-methyl-2-normal butyl phenol are suitable since many of the other phenols accelerate the breakdown of these copolymers.

The process is more completely described in U. S. Patents No. 2,523,289 and 2,462,123.

After the vapors of the volatile components, that is, unreacted olefins, diluent, and catalyst solvent, are volatilized from the flashing tank, they are fed to compression, drying, liquefaction, and distillation equipment for recovery and return to the reaction zone. The slurry of polymer in water leaves the flashing zone and desirably passes to the stripping zone wherein a suitable subatmospheric pressure is maintained. The purpose of this stripping zone is to complete, as far as possible, the removal of volatile materials from the polymer and from the water. In this way, loss of valuable reactant and diluents is minimized, as are fire and other hazards. In addition to the removal of these volatile materials from the polymer, the stripping operation, when combined with properly controlled hot air drying in a tunnel type dryer, makes it possible to achieve essentially complete degassing of the polymer, without resort to heavy mechanical treatment.

As previously indicated, a primary objective is to obtain a short and non-varying incipient cure period in the vulcanization of the polymer. This is done by controlling the pH of hydrogen ion concentration of the aqueous polymer recovery system.

From a consideration of the plant operation, there are at least three major sources of hydrogen or hydroxyl ions which can affect the pH. These sources include the hydrolysis of the Friedel-Crafts type catalyst to produce hydrogen ions, the hydrogen or hydroxyl ions introduced by the water into the flash drum and stripper, and the hydrogen or hydroxyl ions introduced by the addition of the zinc stearate slurry system.

Obviously, the hydrolysis will produce hydrogen ions because of the acidic nature of the products from the Friedel-Crafts type catalyst. The amount of hydrogen ion produced will vary inversely as the catalyst efficiency, that is, a high efficiency catalyst produces a lower hydrogen ion concentration in the aqueous polymer recovery system than does a low efficiency catalyst. The catalyst efficiency may be defined as pounds of polymer produced per pound of catalyst used.

With regard to the effect of the water added to the polymer recovery system, its pH can be controlled. Ordinary plant practice is to employ alkaline water. The process of this invention employs water whose pH is on the acid side of the pH scale.

A third consideration is the pH of the zinc stearate slurry system introduced into the flashing drum. The following reactions which take place easily at flash drum temperatures are to be considered as fundamental to the problem of controlling the variable and excessive incipient cure time.

In an aqueous polymer recovery system consisting of a dispersion of zinc stearate in water together with rubber particles, the following equation indicates the reaction expected in an alkaline environment:

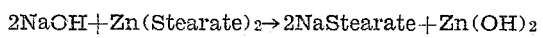
$$2NaOH + Zn(Stearate)_2 \rightarrow 2NaStearate + Zn(OH)_2$$

Not all of the zinc stearate will react unless the pH is maintained at a very high figure; however, the reaction proceeds easily at a pH of 8 until all of the sodium hydroxide has reacted to form sodium stearate. This reaction gives sodium soap and decreases the zinc stearate and results in the production of polymers having prolonged cure time and high scorch characteristics.

In a system maintained on the acid side, the following reaction indicates the reaction of the zinc stearate slurry system in the presence of the polymer:

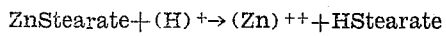
$$ZnStearate + (H)^+ \rightarrow (Zn)^{++} + HStearate$$

This reaction proceeds smoothly at flash drum temperature when the pH of the system is maintained at 4–5. This reduces the soap content of the polymer and so produces a polymer having a short incipient cure time and low scorch characteristics.

In a system to which the zinc stearate is added as such, the problem is to maintain the pH of the zinc stearate slurry on the acid side. However, if the salt is to be manufactured in situ from caustic, fatty acids and zinc salts, further complications are introduced since the reactions for the preparation of zinc soaps or soaps in general do not proceed readily to completion. One particular method of zinc stearate preparation has been found to be satisfactory with the net result of maintaining a slightly acidic slurry system. To carry out this method, a saturated fatty acid is reacted with an aqueous caustic or alkaline earth hydroxide solution and then the reaction product is further reacted with a salt of a metal selected from groups IIA, IIB, and IIIB of the Periodic Table. The pH of the final suspension of the dispersing agent is then adjusted to 7 or lower.

More specifically, the dispersing agent is manufactured in a process which involves the formation of an aqueous alkaline solution, such as a solution of an alkali metal hydroxide such as sodium, potassium, or lithium hydroxides, in water which is heated to a temperature in the range of 170° to 200° F. and preferably between 180° and 190° F., following which the fatty acid is added to the aqueous alkaline solution and reacted at the prevailing temperatures to form an alkali metal salt of the fatty acid in the water. This solution is then further reacted with a salt of a metal from group IIA, IIB or IIIB of the Periodic Table to form a finely divided dispersion of a salt of a saturated aliphatic fatty acid. The anti-oxidants employed such as phenyl-beta-naphthylamine may be added to the admixture either before or after the addition of the metal salt of group IIA, IIB or IIIB of the Periodic Table. After the two reactions have proceeded substantially to completion, the resulting slurry of the metallic-fatty acid salt may be added to the water employed in removing unreacted hydrocarbons from polymers having the properties of rubber and used as a suspending medium.

The saturated aliphatic fatty acid employed is preferably stearic acid although other saturated aliphatic acids or mixture of fatty acids may be used. As examples of other saturated aliphatic acids may be mentioned any of those having from 12 to 20 carbon atoms in the alkyl chain such as tridecanoic, tetradecanoic, palmitic, and arachidic acids having melting points ranging from about 120° F. to about 170° F. As examples of the metal salts which may be used in the practice of the present invention there may be mentioned zinc sulfate and other salts of the group II and III metals, for example, strontium, magnesium, barium, and aluminum.

One of the critical features necessary to control the incipient cure difficulty and the accompanying high Mooney scorch values is to permit the presence of no excess alkali in the slurry of dispersing material. In actual practice, the pH of the slurry system may be controlled by the addition of a dilute solution of a strong acid or a salt which produces an acid reaction by hydrolysis. These salts include the sulfate or chloride of the metal of group IIA, IIB, or IIIB.

To summarize, the stoichiometric amounts employed in the preparation of zinc stearate, the preferred dispersing agent, may be presented by the following equations:

Stearic Acid + NaOH → NaStearate + $H_2O$

2NaStearate + $ZnSO_4$ → Zn(Stearate)$_2$ + $Na_2SO_4$

However, the commercial fatty acids, such as stearic acid, which are used, have been found to vary in acid number from batch to batch. In order to avoid a slightly alkaline final product, a slight deficiency of sodium hydroxide may be employed initially. Alternatively, and to insure against the possibility of stearic acid remaining unreacted, an excess over the calculated amount of sodium hydroxide is used. This excess sodium hydroxide raises the pH of the resulting mixture. To eliminate this alkalinity, and, at the same time, in order to react any sodium stearate that may be present due to an increase in acid number of the stearic acid, an excess, over stoichiometric requirement, of zinc sulfate is added.

Thus, generally, by eliminating the possibility of an excess of sodium hydroxide, the pH of the zinc stearate is lowered, and also the possibility of having any harmful sodium stearate present is removed.

As another alternative procedure, a part of the zinc stearate ordinarily used as the dispersing agent can be replaced by a neutral metallic oxide as, for instance, zinc oxide. This is in line with the overall concept of maintaining the pH below 7 and, in the range of 4.5 to 6.5. It should be emphasized that a minimum amount of zinc stearate gives better Mooney scorch values.

It should be understood that while sodium hydroxide will be the preferred alkaline reagent, potassium and lithium hydroxide may be used in lieu of sodium hydroxide.

In order to further reduce the incipient cure of the polymer, as high a temperature as can be tolerated by the polymer recovery system should be maintained in both the flash drum and the stripper since this favors the reaction for soap and acidic materials and gives polymers having low Mooney scorch characteristics; between 140° F. and 180° F. is best.

Mooney scorch is expressed as the time in minutes for a compound (polymer-100 parts; ZnO-2 parts: sulfur-2 parts; tetramethylthiuram disulfide-0.6 parts) to increase in Mooney value 40 points from the minimum value obtained when operating the Mooney Viscometer at 293° F. using a large rotor.

The table below shows that Mooney scorch value varies with the soap content of the finished polymer. These data were obtained on three series of polymer samples taken as representative composites of batches of polymer produced during times when the scorch values on the polymer varied. Although the scorch figures do not correlate linearly with the soap content of the polymer, the increase of scorch with increasing soap content is clearly shown. The zinc determination represents zinc present in all forms. The stearic acid content also correlates with scorch values. This correlation is significant since stearic acid is a primary product of the acid hydrolysis of zinc stearate.

TABLE

*Soap and fatty acid in butyl rubber*

| Sample Number | Mooney Scorch | Total Zinc, Weight Percent | Total Soap as Zinc Stearate, Weight Percent | Stearic Acid, Weight Percent |
|---|---|---|---|---|
| I: | | | | |
| 1 | 8.2 | 0.97 | 0.45 | 0.31 |
| 2 | 16.7 | 1.16 | 0.74 | 0.02 |
| 3 | 15.4 | 0.98 | 0.80 | 0.04 |
| 4 | 12.6 | 0.90 | 0.49 | 0.34 |
| 5 | 9.2 | 0.89 | 0.32 | 0.31 |
| 6 | 9.3 | 0.85 | 0.32 | 0.47 |
| II: | | | | |
| 1 | 7.9 | | 0.12 | 0.02 |
| 2 | 9.2 | 1.07 | 0.57 | |
| 3 | 11.3 | | 0.59 | 0.15 |
| 4 | 18.2 | 0.87 | 0.95 | |
| 5 | 18.5 | 1.00 | 1.06 | |
| 6 | 12.7 | | 0.49 | |
| 7 | 7.6 | 0.95 | 0.11 | 0.68 |
| III: | | | | |
| 1 | 9.6 | | 0.23 | |
| 2 | 13.1 | | 0.38 | |
| 3 | 10.1 | | 0.48 | |
| 4 | 7.3 | | 0.12 | |

The present invention will be further described with reference to the following example which is intended to illustrate one modification thereof.

In this modification of the invention, a solution of sodium stearate, for example, is prepared in a tank or other suitable mixing equipment. An aqueous, alkaline solution as, for example, sodium hydroxide and water is introduced into the mixing zone which is provided with a means for heating. Thus, a dilute, aqueous, alkaline solution containing, for example, about 3% by weight of sodium hydroxide is prepared. This solution is heated to a temperature of about 180° to 190° F. Solid stearic acid is then added and is intimately admixed with the aqueous, alkaline solution to cause the reaction to form sodium stearate as outlined in the above illustrated equation. Alternatively, solid sodium stearate itself may be dissolved in a tank in a suitable amount of water to produce a solution thereof.

The sodium stearate solution is then caused to react with a metallic salt such as zinc sulfate. The zinc sulfate may be added to the tank containing the sodium stearate either as a solution or in solid form. Following the addition of the zinc sulfate, the mixture is violently agitated in order to provide intimate contact of the two reactants to form zinc stearate.

As an example of a typical commercial operation, 58.8 pounds of sodium hydroxide were subjected to reaction with 400 pounds of stearic acid to form a resulting solution of sodium stearate. The reactants were dissolved in approximately 3000 gallons of water and maintained at about 140° F. for 1½ hours. Then this solution was admixed with 150–160 pounds of zinc sulfate monohydrate crystals, the amount of zinc sulfate employed representing approximately a 20–25% excess of zinc sulfate over the stoichiometric quantity demanded by the chemical reactions, assuming the use of pure stearic acid. The resulting solution had a total solids content of approximately 0.4–0.8 pound per gallon.

After the mixture of sodium stearate and zinc sulfate had been sufficiently agitated to complete the formation of the zinc stearate, the resulting solution was heated to a temperature of 130–150° F. and pumped into the flashing tank used for recovery of isobutylene-isoprene copolymer. The flash tank is partially filled with water, the pH of which is controlled. A sufficient amount of water soluble wetting agents, phenyl-beta-naphthylamine, or other solid stabilizer may be added to the solution as desired. When an excess of zinc sulfate is used, the pH value of the flashing liquid will be between 4.5 and 6.5.

Into the warm flashing liquid there is discharged a cold stream containing rubbery copolymer prepared by the Friedel-Crafts polymerization of the mixture of isobutylene and isoprene. The temperature of the flashing solution which is between 140° and 170° F. as maintained with steam condensing into the flashing drum, is sufficiently high to effect a heating of the colder, polymer-containing stream. This heating effect causes the distillation of unreacted hydrocarbons and diluent therefrom. These materials are flashed from the solution and subsequently discharged from the flashing tank and recovered.

The aqueous slurry of hydrocarbon copolymer remaining in the aqueous flash liquid is found to be suitably dispersed therein. Upon completion of the usual recovery procedure for the hydrocarbon copolymer, it is found that the Mooney scorch and incipient cure characteristics are both substantially reduced.

The use of excess zinc sulfate or other acidic material also results in the desired maintenance of a lower pH value of the aqueous slurry which remains following the recovery of the copolymer. This slurry is generally subjected to a stripping operation for the removal of final residual amounts of olefinic hydrocarbons and diluent. The remaining aqeuous solution, containing zinc stearate dispersed therein, can be recycled together with additional zinc stearate solution for reuse as liquid in the flashing tank.

During commercial runs employing the above-described process, it was found that no lumpy rubber agglomerates were formed and the polymer slurry was thoroughly dispersed in the water solution and was easily handled in the driers, extruders, and mills making up the finishing process equipment. Furthermore, it was found that during vulcanization of the rubbery products prepared from the copolymer the variability of the induction period was practically eliminated and the incipient cure period itself substantially shortened.

What is claimed is:

1. In a process comprising polymerizing isobutylene at a temperature between −50 and −165° C. in contact with a Friedel-Crafts catalyst dissolved in an organic non-complex forming solvent which is liquid at the reaction temperature to form a polymer, discharging said polymer into water heated to at least 60° C., said water containing a water-insoluble soap of a saturated fatty acid having 12 to 20 carbon atoms per molecule and a metal selected from the group consisting of aluminum, zinc, magnesium, calcium, strontium and barium in order to flash off the volatile reaction liquid and maintain the polymer in finely divided form as an aqueous slurry, and recovering solid polymer therefrom the improvement which comprises maintaining the aqueous slurry at a pH below 7.

2. In a process comprising polymerizing isobutylene at a temperature between −50 and −165° C. in a diluent having from 1 to 4 carbon atoms per molecule which is liquid at the polymerization temperature in contact with a Friedel-Crafts catalyst dissolved in an organic non-complex forming solvent which is liquid at the reaction temperature to form a slurry of solid polymer particles in cold reaction liquid discharging said slurry into well agitated water heated to a temperature of at least 60° C., said water containing a water insoluble soap of a saturated fatty acid having from 12 to 20 carbon atoms per molecule and a metal selected from the group consisting of aluminum, zinc, magnesium, calcium, strontium and barium in order to flash off the volatile reaction liquid and form a slurry of finely divided particles in water, and recovering solid polymer therefrom the improvement which comprises maintaining the aqueous slurry at a pH between 4.5 and 6.5.

3. In a process comprising mixing a major proportion by weight of a mono-olefin and a minor proportion by weight of a polyolefin having from 4 to 14 carbon atoms in the molecule and an organic diluent which is less than 5 carbon atoms and is liquid at the reaction temperature, cooling the mixture to a temperature between −50 and −165° C. and contacting said cold mixture with a solution of a Friedel-Crafts catalyst in a non-complex forming organic solvent which is liquid when contacted with said mixture to form a slurry of solid polymer particles in cold reaction liquid, discharging said slurry into well agitated water which is heated to a temperature of at least 60° C. and to which has been added a dispersion of a water-insoluble metal soap of a saturated fatty acid having from 12 to 20 carbon atoms per molecule and a metal selected from the group consisting of aluminum, zinc, magnesium, calcium, strontium and barium to flash off the volatile reaction liquid and form a slurry of finely divided particles in water, and recovering solid polymer therefrom the improvement which comprises maintaining the aqueous polymer slurry at a pH between 4.5 and 6.5.

4. Process according to claim 3 in which the monoolefin is present in an amount between 70 and 99.5 wt. per cent and the polyolefin is present in an amount between 0.5 and 30 wt. per cent.

5. Process according to claim 4 in which the mono-olefin is isobutylene.

6. Process according to claim 5 in which the poly-olefin is isoprene.

7. Process according to claim 6 in which the water insoluble soap is zinc stearate.

8. A process according to claim 4 wherein the diluent is a compound having from 1 to 4 carbon atoms per molecule.

References Cited in the file of this patent

UNITED STATES PATENTS

| Number | Name | Date |
|---|---|---|
| 2,378,693 | Fryling | June 19, 1945 |
| 2,417,071 | Gebhart et al. | Mar. 11, 1947 |
| 2,459,740 | Bebb | Jan. 18, 1949 |
| 2,478,718 | Singleton | Aug. 9, 1949 |

OTHER REFERENCES

"Handbook of Chemistry and Physics," 30 Ed., Chemical Rubber Publishing Co. (1947), page 312.

"Handbook of Chemistry and Physics," 30th Edition, Chemical Rubber Publ. Co. (1947), pages 310 and 311.